United States Patent [19]

Vincent et al.

[11] Patent Number: 4,845,309
[45] Date of Patent: Jul. 4, 1989

[54] SILICONE WATER BLOCK FOR ELECTRICAL CABLES

[75] Inventors: Gary A. Vincent; Daniel F. Meyer, both of Midland, Mich.

[73] Assignee: Dow Corning Corporation, Midland, Mich.

[21] Appl. No.: 41,558

[22] Filed: Apr. 23, 1987

[51] Int. Cl.[4] ............................................. H02G 15/20
[52] U.S. Cl. ................................. 174/23 C; 523/173; 156/48
[58] Field of Search ............................ 523/173; 156/48; 174/23 C

[56] References Cited

U.S. PATENT DOCUMENTS

| | | | |
|---|---|---|---|
| 3,252,834 | 5/1966 | Vincent | 117/231 |
| 3,527,874 | 9/1970 | Hayami | 174/24 |
| 3,634,569 | 1/1972 | Anderson | 264/36 |
| 3,939,882 | 2/1976 | Gillemot | 141/231 |
| 4,008,197 | 2/1977 | Brauer et al. | 260/31.6 |
| 4,231,986 | 6/1980 | Brauer et al. | 264/272 |
| 4,237,172 | 12/1980 | Packo et al. | 428/63 |
| 4,372,988 | 2/1983 | Bahder | 427/52 |
| 4,451,692 | 5/1984 | Classens et al. | 174/23 C |
| 4,596,743 | 6/1986 | Brauer et al. | 428/380 |

FOREIGN PATENT DOCUMENTS

2729368 10/1978 Fed. Rep. of Germany.
3304715 8/1984 Fed. Rep. of Germany.

*Primary Examiner*—Joseph L. Schofer
*Assistant Examiner*—J. M. Reddick
*Attorney, Agent, or Firm*—Alexander Weitz

[57] ABSTRACT

There is provided a method of extending the serviceable life of a stranded conductor electrical distribution cable wherein the interstices of the conductor are filled with a curable silicone water block composition which is subsequently cured to a non-flowing state. The composition has a low viscosity and comprises (A) an Si-H endblocked polydiorganosiloxane fluid, (B) a polydiorganosiloxane fluid endblocked with an unsaturated organic radical, (C) a siloxane crosslinker, (D) a hydrosilation catalyst and (E) a polymerization inhibitor. Proper selection of catalyst and inhibitor concentrations imparts a controllable viscosity-time profile to the composition and allows cables of various sizes and lengths to be filled before the water block composition cures.

14 Claims, No Drawings

4,845,309

SILICONE WATER BLOCK FOR ELECTRICAL CABLES

The present invention relates to an improved stranded conductor electrical distribution cable and methods for making said improved stranded conductor electrical distribution cable. More particularly, this invention relates to a method for filling the interstices of the stranded conductor with a curable organosilicone water block composition to improve the electrical breakdown point of the cable and extend its serviceable life.

BACKGROUND OF THE INVENTION

One of the major problems associated with electrical distribution cable is its tendency, over a period of time, to fail due to degradation of its insulation. The degradative processes involved in the failure of cables are associated with two "treeing" processes.

"Electrical treeing" is the product of numerous electrical discharges in the presence of strong electrical fields which eventually lead to the formation of voids within the insulation material. These voids resemble the trunk and branches of a tree in profile under microscopic observation, from which the descriptive terminology derives. As the trees formed by this process grow, they provide further routes along which corona discharges can occur, the cumulative effect being electrical breakdown of the insulation. Electrical treeing generally occurs when large voltages are imposed on the cable. The degradative results of the electrical treeing process can be precipitous such that the electrical cable can break down in a relatively short period of time.

The second type of treeing, known as "water treeing," is observed when the insulation material is simultaneously exposed to moisture and an electric field. This mechanism is much more gradual than electrical treeing, requiring an extended period of time to cause the degree of damage that affects the insulation characteristics of the distribution cable. However, since water treeing occurs at considerably lower electrical fields than required for the formation of electrical trees, this phenomenon is a leading cause of reduced service life of cables which allow water entry to the conductor region, whether through diffusion or some other mechanism.

It is known that water treeing can be reduced by the incorporation of an anti-tree additive (e.g., various organo silanes) in the insulation composition of the cable. Alternatively, this problem has been attacked by excluding water from the cable's interior by filling the interstices of the cable conductor with a dielectric material which effectively acts as a "water block." For the purposes herein, the term "interstices" includes the void space between individual conductor wires as well as voids between the wires and the insulation. The prior art teaches several compositions and methods for prolonging the service life of cables and reclamation of cables already damaged by the abovedescribed treeing phenomena.

U.S. Pat. No. 3,527,874 to Hayami teaches the use of silicon (sic) oil, or a silicon-hydrocarbon oil mixture, to fill the interstices between the conductor and insulation of an electrical distribution cable. Hayami teaches using low viscosity oils which can flow or exude through the cable's insulation layer. Thus the positive effects of the oil on the insulation would be lost when the oil leaks or exudes from the cable interior.

U.S. Pat. No. 4,372,988 to Bahder teaches a method for reclaiming electrical distribution cable which comprises: purging the cable with a desiccant gas; then supplying, in a continuous fashion, a tree retardant liquid, such as a polydimethylsiloxane fluid, to the interior of the cable. Bahder does not, however, teach the addition of a curable organosilicone material to the interstices of the electrical distribution cable, and this disclosure also suffers from the above mentioned disadvantage in that the fluid can exude or leak from the cable. This reference addresses the potential loss of fluid by providing reservoirs which can maintain a constant fluid level, further adding to the complication of this system.

U.S. Pat. No. 3,939,882 to Gillemot teaches a cable reclamation apparatus which facilitates the injection of a reactive fluid mixture, such as polyurethane formulation, which cures to a paste like gel in the interstices of the cable. The initial mixture pumped into the cable reclaimed by this method has a viscosity on the order of about 200 cP at 70° F. The polyurethane gel is formed by mixing two reactive components, thus requiring specialized equipment in order to deliver properly formulated uncured mixture to the cable interior. The formulations used in conjunction with this apparatus are, however, only useful for relatively short cable lengths due to the high viscosity and short cure times associated with the reactive fluid.

U.S. Pat. No. 4,008,197 to Brauer et al. teaches a method of forcing a low viscosity material into the internal free spaces of an insulated electrical device. This material acts to displace fluid contaminants and cures in situ to form a hydrophobic seal with good electrical properties.

U.S. Pat. No. 4,231,986 to Brauer et al. teaches a grease compatible material oil extended polyurethane composition which is useful in filling electrical devices. The compositions taught by Brauer are supplied to electrical devices as two component systems which require special metering devices to ensure that the proper formula is delivered to the cable. The grease compatible composition comprises: polyurethane precursor; mineral oil; and a coupling agent (or emulsifier) to stabilize the mixture.

U.S. Pat. No. 4,596,743 to Brauer et al. teaches a grease compatible extended polyurethane composition similar to the mineral oil extended polyurethane composition except that cyclic olefin extenders are used in the place of mineral oil.

The three patents to Brauer et al., cited supra, employ curing compositions which soon achieve a relatively high viscosity and must be pumped into the cable before cure has progressed to a significant extent. Otherwise, the attendant viscosity rise prevents efficient filling of all voids in the conductor region. The consequence of such an uncontrolled cure is that only relatively short cable lengths can be effectively filled using these compositions.

Various manufacturers currently provide cables which are filled with tar-like water block compounds (e.g., polyisobutylene) as a part of cable production. Typically, the water block compound is fed into the back end of a die through which wires are passed as they are twisted to form the conductor. Although such materials can work effectively to exclude water from the interior of these cables, the associated manufacturing process has proven quite difficult. This difficulty arises from the need for a precise balance between the water block feed rate and the conductor line speed. If too little compound is fed to the die, there will be voids in the water block where water can collect. If too much compound is fed, this will form a lump on the surface of the conductor and reduce the thickness of the insulation which is extruded over the conductor. This, in turn, would produce a weak spot in the insulation, making it more susceptible to electrical breakdown.

SUMMARY OF THE INVENTION

It has now been found that the above described disadvantages can be overcome by curable silicone water block compositions having a low initial viscosity and a controllable viscosity-time profile. The present invention thus permits tailoring the initial composition of the water block to account for different requirements imposed by variously sized and shaped cables. It is this combination of properties which allows the water block compositions of the present invention to easily penetrate conductor interstices and permits relatively long lengths of cable to be effectively filled at a cable manufacturing site or in the field. Once cured, these compositions are non-bleeding gels which will not leak, diffuse or exude from the cable's interior. Moreover, it has been found that the water block compositions of the present invention also increase the breakdown voltage of the cable, thus allowing for the transmission of higher voltage currents, or the use of smaller diameter cables. The compositions also adhere to both the insulation material and conductor of electrical distribution cables and thus form effective seals between these two different surfaces.

The present invention thus relates to a method of extending the serviceable life of a stranded conductor electrical distribution cable comprising: (i) filling the interstices of said conductor with a curable water block composition; and (ii) curing said composition, said composition having an initial viscosity of less than about 100 centistokes at 25° C. and a controllable viscosity-time profile such that the viscosity remains below about 200 centistokes at 25° C. until the cable is filled with said water block composition and rises rapidly thereafter to a nonflowing state.

This invention also relates to a similar method wherein the water block composition comprises:

(A) an Si-H endblocked polydiorganosilozane fluid having a viscosity of 0.5 to about 100 centistokes at 25° C. and represented by the formula $H(R'_2SiO)_x(R'_2Si)H$ wherein R' is independently selected from alkyl radicals having from 1 to 6 carbon atoms or the phenyl radical and the average value of x is 1 to 40;

(B) a polydiorganosiloxane fluid having a viscosity of 0.5 to about 100 centistokes at 25° C. and represented by the formula

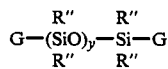

wherein G denotes unsaturated radicals independently selected from the vinyl group or higher alkenyl radicals represented by the formula $—R'''(CH_2)_mCH=CH_2$, in which R''' denotes $—(CH_2)_p—$ or $—(CH_2)_qCH=CH—$, m is 1, 2, or 3, p is 3 or 6 and q is 3, 4 or 5, R'' is independently selected from an alkyl radical having from 1 to 6 carbon atoms or a phenyl radical and y is on the average from 1 to about 40;

(C) a siloxane crosslinker selected from short chain linear or cyclic siloxanes containing SiH functionality or Si-G functionality, in which G has the above-defined meaning;

(D) sufficient hydrosilation catalyst to cure the mixture of (A), (B), and (C); and (E) sufficient polymerization inhibitor to prevent the water block composition from curing to a non-flowing state before the cable is filled with the combination of (A), (B), (C), (D) and (E).

The present invention further relates to a method for restoring in-service electrical distribution cable having a stranded conductor and polyolefin insulation, comprising:

(i) drying the interstices of said conductor;

(ii) exposing the interior of said cable to an anti-treeing additive till said additive is absorbed by the insulation;

(iii) removing excess of said anti-treeing additive from the interior of said cable;

(iv) filling the interstices of said stranded conductor the above-describe water block composition; and (v) curing said water block composition;

The present invention still further relates to a cable filled with the cured water block composition described above as well as to the composition itself.

DETAILED DESCRIPTION OF THE INVENTION

The present invention relates to water block compositions and their use in original equipment manufacture as well as in the restoration of in-service cable to effective performance levels. The water block compositions of the present invention have several important qualities that are critical to their performance. Initially, the compositions are low viscosity fluids that can be pumped or drawn through the interstices of a stranded conductor electrical distribution cable. The compositions cure in the cable to form elastomeric or highly viscous materials that will not flow out of a vertical portion of the cable when the cable is heated for a period of time. The materials cure in the cable only after sufficient time has passed so that the material can be pumped or drawn the full length of the cable being treated. The compositions of the present invention have intrinsic insulating properties which improve the breakdown voltage of cables filled with the compositions. Additionally, the compositions adhere to both the conductor material and to the polyolefin materials used in modern electrical distribution cables.

The initial viscosity required for the water block composition will depend upon the length of the cable being filled with the composition, the size of the stranded conductor and its structure, and the amount of pressure of vacuum used to pump or draw the fluid through the cable. For instance, extremely long cables require either greater pressures or longer time periods for the water block composition to be drawn the full length of the cable than would be required for shorter cables. Lower initial viscosities can be used to shorten the period required to pump or draw the water block composition through the cable. In order to be within the scope of this invention, the water block composition must have an initial viscosity no greater than about 100 cS (centistokes) at 25° C.

The cure time for the compositions must be sufficiently long for the fluid to be drawn in full length of the cable before the viscosity of the material rises to the point where further pumping or drawing of the fluid through the cable is impossible. Obviously, the desired cure time will vary from cable to cable based upon the initial viscosity of the water block composition and the time required to pump or draw the initially low viscosity water block composition through the cable. Thus it is very important to be able to control the time required to cure the water block composition being used in order to optimize the efficiency and effectiveness of applying the water block composition to the cable interstices. The combination of a reaction catalyst and, optionally, a polymerization inhibitor in the present invention allows the control of the viscosity-time profile of the present water block compositions to be adapted to the specific needs of a particular length and structure of electrical cable. In order to be within the scope of this invention, the viscosity of the water block composition must be controllable such that it remains below about 200 cS at 25° C. until the cable is filled with said water block composition and rises rapidly thereafter to a nonflowing state. Preferably, the viscosity remains below about 200 cS for a period of up to 24 hours at 25° C.

The water block compositions of the present invention cure to a sufficient viscosity so that the cured water block will not exude from the cable. This allows the water block to be added as an original equipment feature of the cable by introducing the water block to an otherwise completed cable on a spool.

It has been found that certain curable organosilicon materials meet the above requirements and thus provide effective water block compositions. These compositions comprise: (A) an Si-H endblocked polydiorganosiloxane fluid; (B) a polydiorganosiloxane fluid endblocked with unsaturated organic radicals; (C) a siloxane crosslinker; (D) a hydrosilation catalyst and (E) a polymerization inhibitor.

The Si-H endblocked polyorganosiloxane fluids (component A) useful in the present invention are of the general formula $$\begin{array}{c} R' \quad R' \\ H-(SiO)_x-Si-H \\ R' \quad R' \end{array}$$

where R' is independently selected from an alkyl radical having 1 to 6 carbon atoms or a phenyl radical and x is on the average between 1 and 40. Preferably, R' is the methyl radical. A consideration in choosing these materials is their flammability. In order to be within the scope of this invention, the viscosity of component (A) must be between 0.05 cS and about 100 cS at 25° C. and preferably below 50 cS. In general, lower molecular weight polydiorganosiloxanes are easier to ignite than higher molecular weight species, and fluids having an open cup flash point of greater than 100° F. (i.e., classified as "combustible" rather than "flammable") are preferred from a manufacturing safety standpoint. Otherwise, fluids having the lowest viscosities (i.e., molecular weight) are desirable since these permit more efficient filling of cables according to this invention. The most preferred Si-H endblocked fluids have a value of x from about 5 to 20. A representative fluid has an average value of x of about 15 wherein R' is methyl.

Component B of the present invention is a fluid which may be represented by the general formula $$\begin{array}{c} R'' \quad R'' \\ G-(SiO)_y-Si-G \\ R'' \quad R'' \end{array}$$

wherein G denotes unsaturated radicals independently selected from the vinyl group or higher alkenyl radicals represented by the formula $-R'''(CH_2)_mCH=CH_2$, in which R''' denotes $-(CH_2)_p-$ or $-(CH_2)_qCH=CH-$, m is 1, 2, or 3, p is 3 or 6 and q is 3, 4 or 5. In the above formula, R'' is independently selected from an alkyl radical having 1 to 6 carbon atoms or a phenyl radical and y is on the average from 1 to about 40. Again, in order to be within the scope of this invention, the viscosity of component (B) must be between 0.5 cS and about 100 cS at 25° C. and preferably below 50 cS. It is also preferred that the flash point of this component be above 100° F. and the viscosity be the lowest value consistent with this embodiment. Specific examples of the G radicals contemplated herein may be found in U.S. Pat. No. 4,609,574 to Keryk et al., assigned to the assignee of this invention, and hereby incorporated by reference. Preferably, G is either the 5-hexenyl or the vinyl radical, vinyl being most preferred. It is also preferred that the group R'' is the methyl radical and y is between 5 and 20. A representative fluid has a value of y of about 7 wherein G is vinyl and R'' is methyl.

The siloxane crosslinker (component C) is selected from short chain linear or cyclic siloxanes containing either SiH functionality or Si-G functionality, wherein G has the aboverecited meaning. The linear species may be represented by the general formula $$\begin{array}{c} R'_3SiO(R'SiO)_n(R'_2SiO)_mSiR'_3 \\ Q \end{array}$$

wherein R' has been previously defined and is preferably the methyl radical. In the above formula, Q represents either hydrogen or the unsaturated radical G, n can range, on average, from 3 to about 100 and m can be zero or as much as about 100. Again, it is preferred that G is selected from 5- hexenyl or vinyl radicals, vinyl being most preferred. Examples of suitable linear siloxane crosslinkers include $$\begin{array}{cc} Me_3SiO(MeSiO)_{35}SiMe_3 \text{ and } Me_3SiO(MeSiO)_{10}SiMe_3. \\ H & Vi \end{array}$$

The cyclic species suitable for use as component (C) of this invention may be represented by the general formula $$\begin{array}{c} (R'SiO)_z \\ Q \end{array}$$

wherein R' and Q have their previous meaning and z is 3 to 6. These crosslinkers may be pure species or mixtures having several values of z. Specific examples of such cyclic mixtures include $$\begin{array}{ccccc} (MeSiO)_z, & (EtSiO)_z, & (PhSiO)_z, & (MeSiO)_z, \text{ and } & (BuSiO)_z, \\ Vi & Vi & Vi & H & H \end{array}$$

wherein Me denotes the methyl radical, Et denotes the ethyl radical, Ph denotes the phenyl radical Bu denotes the butyl radical and z can be 3 to 6.

For the purposes of the present invention, a highly preferred crosslinker is a mixture of cyclic species represented by the formula

wherein Me denotes the methyl radical and z is 3 to 5.

The siloxanes of components (A), (B) and (C) are well known in the art and description of their preparation need not be detailed herein.

The polymerization catalyst (component D) for the reaction between the polydiorganosiloxane fluid endblocked with unsaturated organic radicals, the Si-H endblocked polydiorganosiloxane fluid and the siloxane crosslinker, includes a variety of hydrosilation catalysts known to promote the reaction of vinylfunctional radicals with silicon bonded hydrogen atoms. Active metal catalysts such as platinum or rhodium-containing metal compound are included in this class of catalysts. Platinum catalysts such as platinum acetylacetonate or chloroplatinic acid are representative of these compounds and suitable for use as component D. A preferred catalyst mixture is a chloroplatinic acid complex of divinyltetramethyldisiloxane diluted in dimethylvinylsiloxy endblocked polydimethylsiloxane which may be prepared according to methods described by Willing in U.S. Pat. No. 3,419,593. Most preferably, this mixture contains about 0.6 weight percent platinum.

Hydrosilation catalysts are well known in the art and the interested reader is referred to the following patents for detailed descriptions regarding their preparation and use: Speier, U.S. Pat. No. 2,823,218; Willing, U.S. Pat. No. 3,419,593; Kookootsedes, U.S. Pat. No. 3,445,420; Polmanteer, et al., U.S. Pat. No. 3,697,473; Nitzsche, U.S. Pat. No. 3,814,731; Chandra, U.S. Pat. No. 3,890,359; and Sandford, U.S. Pat. No. 4,123,604. Many of the catalysts known in the art require the reactants to be heated in order for reaction to occur. When such catalysts are employed, this requirement must be taken into consideration in manufacturing the cable or in restoring used cable.

When platinum catalysts are used, an inhibitor (component E) may be required in order to improve the shelf life of the starting materials and to control the viscosity-time profile of the water block compositions. These inhibitors are also known in the art and include ethylenically unsaturated isocyanurates, such as triallylisocyanurate, dialkylacetylenedicarboxylates, alkyl maleates, phosphines, phosphites, aminoalkyl silanes, sulfoxides, acrylonitrile derivatives and others. Particular inhibitors preferably used in the present invention are diethyl fumarate, bis (2-methoxy-1-methylene)maleate, bis (2-methoxy-1-methylethyl) maleate and similar compounds. The preferred inhibitor of the present invention is bis (2- methoxy-1--methylethyl) maleate.

The concentrations of catalyst and inhibitor to be used in the present invention may be determined by routine experimentation and depend on the type, size and length of cable that is to be filled. Thus, the amount of inhibitor used is that which is sufficient to allow the cable to be filled with the combination of (A), (B), (C), (D) and (E) before said combination cures to a non-flowing state. It is possible to inhibit viscosity build up of the water block compositions of this invention such that the compositions remain fluid for hours or days, while they are pumped into the cable. Typically, the effective amount of catalyst should be in a range so as to provide from about 0.1 to 1000 parts per million (ppm) of platinum by weight in the water block compositions of the present invention. As an example, when the preferred catalyst mixture (i.e., the chloroplatinic acid complex of divinyltetramethyldisiloxane containing about 0.6% by weight of platinum) and preferred inhibitor (i.e., bis (2-methoxy-1-methylethyl) maleate) are employed, a ratio by weight of inhibitor to catalyst mixture ranging from zero to about 0.6 provides a suitably wide range of inhibition which is adequate for filling cables under most practical conditions of manufacture or field application (e.g., about 140 hours at 25° C.).

The water block compositions of the present invention may be prepared by simply mixing the components (A) through (E) to obtain a homogeneous blend. Any mixing method known in the art is suitable and, as far as is known, the order of mixing is not critical. It has been found that, when the crosslinker is the preferred methylvinylcyclosiloxane, it is convenient to prepare a two-part system wherein part I contains component (A) and some of component (B) and part II contains the other components (C through E) and the remainder of component (B) such that 2 parts of I are blended with 1 part of II to form the water block composition. It will be recognized, of course, that any mixture containing both SiH and SiVi groups as well as the catalyst is inherently unstable with respect to viscosity build up and must be used as soon as possible.

In order to be within the scope of the present invention, the water block composition must cure to a non-flowing state and must not exude or drip from a cable filled with the composition. It is preferred that the cured compositions have a consistency between a lightly crosslinked liquid and a soft elastomer. Most preferably, the resultant cured compositions have the consistency of a soft gel which is tacky to the touch and is self-healing when penetrated by a solid object, as would occur during cable repair operations. This type of gel was described by Nelson in U.S. Pat. No. 3,020,260. In any event, it is preferred that, when cured, these compositions be non-flowing to the extent that a one-foot section of cable which has been filled with the water block does not exude or drip when held vertically for one hour at 130° C.

Typical compositions of this invention comprise from about 10 to 100 parts by weight of component (A), from about 10 to 100 parts by weight of component (B), from about 0.1 to 10 parts by weight of component (C), sufficient hydrosilation catalyst (D) to facilitate a cure of the mixture (A), (B), and (C) and sufficient polymerization inhibitor (E) to allow an electrical distribution cable to be filled with the combination of (A), (B), (C), (D), and (E) before said combination cures. The exact relative amounts of components (A), (B) and (C) to be used are determined by routine experimentation to provide the desired final cured properties described above. Preferably, the molar ratio of Si-H functionality to unsaturated radical (i.e., Si-G) functionality of the components is approximately 1:1. However, since the accurate determination of these functionalities is known to be difficult, it is further preferred that several trial compositions, using the particular components of interest, be prepared to determine their final cured properties before formulating a full batch of the water block composition for filling a cable. Indeed, it is known in the art to use routine experimentation in arriving at a desired composition based on final cured properties when preparing compositions which cure by the SiH to SiVi addition. Such systems do not ordinarily lend themselves to precise formulation by a prescribed recipe. Thus, one such embodiment consists of about 100 parts by weight of component (A), in which R' is methyl and x is about 15, about 54 parts by weight of component (B), in which R" is methyl and y is about 7, and about 0.5 part by weight of $(MeViSiO)_z$, in which z is between 3 and 5 and about 0.75 parts by weight of the chloroplatinic acid complex of divinyltetramethyldisiloxane diluted in dimethylvinylsiloxy endblocked polydimethylsiloxane which contains about 0.6 weight percent platinum. To this mixture, the preferred inhibitor, bis (2-methoxy-1-methylethyl) maleate, may be added in such proportion that the weight ratio of inhibitor (E) to catalyst (D) varies from zero to about 0.5 to provide controlled viscosity build up as the composition cures at ambient temperature.

The water block compositions of the present invention are useful in filling the interstices of stranded conductor electrical distribution cable. This type of cable comprises a conductor which is formed from multiple wires or other conductors twisted or braided together to form the conductor. The conductor is covered with an insulating material. In such configurations, the conductor portion of the cable contains voids between the multiple braided or twisted conductors running the full length of the cable. These voids allow moisture to migrate through the cable which contributes to the above discussed treeing processes throughout the cable. The water block compositions of the present invention are used to fill the interstices of the conductor portion of the cable, thereby preventing this water migration.

The insulation materials typically used in electrical distribution cables of the type which can be manufactured or restored using the water block compositions of the present invention are polyolefins and copolymers of polyolefins. The polyolefins include solid polymers of olefins, particularly alpha-olefins, which comprise from about two to six carbon atoms. Specific examples of these insulating materials include crosslinkable and non-crosslinkable polyethylene, polypropylene, polybutene, polyisobutylene, poly(4-methyl pentene) and the like. Copolymers of ethylene, and other compounds interpolymerizable with ethylene, such as butene-1, pentene-1, propylene, styrene, and the like, may also be employed. In general, the copolymer will comprise more than 50 per cent by weight of ethylene units.

Suitable examples of olefin-vinyl copolymers include those of ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like.

Specific examples of olefin-allyl copolymers include ethylene-allyl benzene, ethylene-allyl ether and ethylene-acrolein. However, the preferred polymer insulation is polyolefin, the most preferred being polyethylene.

The water block composition can be applied to the cable by a number of methods and at various points in the manufacture of the cable. One of the chief advantages of the present invention is that the water block can be supplied to the interstices of the cable after the insulation material has been extruded onto the conductor, but before the cable is placed in service. For instance, cable on spools can be filled with the water block compositions of the present invention in the factory. Thus, the production of water block-containing cable can be simplified over the currently employed methods, discussed supra.

The water block composition can be supplied to the cable by either pumping the material through the interstices of the stranded conductor portion of the cable, or by drawing the composition through the cable by applying a vacuum to one end of the cable and providing a supply of the water block composition at the opposite end. Alternatively, the water block composition may be pumped from one end of a cable and a vacuum simultaneously applied to the opposite end of the cable. Such methods are well known in the art and up to about 5,000 feet of cable can be filled with the compositions of this invention at a time using these procedures.

The method wherein the water block is supplied under pressure is preferred since it allows longer cable lengths to be filled than the vacuum procedure, which is limited to the normal atmospheric pressure of about 15 psi. In this case, typical pressures used to force the water block composition into the cable are in the range of 500 to 1000 psi. In any event, the maximum pressure which can be used is limited mainly by the strength of the cable insulation and jacket, pressures as high as about 3000 psi being contemplated in the process of this invention. Of course, even higher pressures may be employed by applying additional hydrostatic pressure (i.e., beyond atmospheric) to the outside of the cable during the filling operation. In one embodiment, this method comprises attaching a fitting to one end of the cable which, in turn, is connected to a receiver/dispenser cylinder. Above the receiver/dispenser cylinder, and connected to it by gravity line means, is situated a reservoir into which the mixed water block composition of this invention is introduced. A driver cylinder is connected to the receiver/dispenser cylinder through appropriate valving so as to fill the latter with the water block composition during its backstroke operating while pumping the composition to the cable during its forward stroke. This process is repeated till the entire cable is filled with the water block composition. The valving associated with this equipment can be automated to follow the fill-pump cycle. After the cable is filled, the water block composition is allowed to cure, normally at ambient temperature.

In a similar manner, the water block of the present invention can be added to a cable that is already in service although equipment requirements may vary in light of the need for portability. Again, these methods are well known in the art.

When the water block composition is used in a process to restore distribution cable which has already experienced some damage due to treeing, the cable should first be dried by either passing a desiccant fluid through the conductor portion or by heating the cable. Desiccant fluids which can be used to dry the cable include helium, nitrogen, compressed atmospheric air which has been dried or the alkoxysilane antitreeing additives recited infra. It is preferred to follow this drying step with one wherein the interstices of the conductor are exposed to an anti-treeing additive for a sufficient period to allow said additive to permeate said polyolefin insulation to the extent that from about 0.1 and 5 weight percent of the additive is absorbed by the insulation. After this step, excess anti-treeing additive is removed from the cable's interior and the water block composition of the present invention applied, as above.

Examples of suitable anti-treeing additives include acetophenone, phenylmethyldimethoxysilane, phenyltrimethoxysilane, phenytriethoxysilane and phenylmethyldiethoxysilane. Further details describing these steps (i.e., prior to application of the water block composition) may be found in copending patent application to Meyer and Vincent, filed Dec. 29, 1986, Ser. No. 947,134, and assigned to the assignee of the present invention, which is hereby incorporated by reference.

In each case, the water block composition should be mixed just before being used to fill a cable. In particular, and as discussed above, the catalyst should not be combined with a mixture of Si-H functional fluid and Si-G functional fluid until the water block material is ready to be supplied to the cable.

EXAMPLES

The following examples are offered to assist those skilled in the art to better understand the invention. The examples presented are not meant to delineate the scope of the invention, which is defined in the appended claims.

EXAMPLE 1

This example illustrates a representative water block composition wherein the following homogeneous mixture was prepared at room temperature:

(A) 100 grams of a Si-H fluid comprised of endblocked polydimethylsiloxane fluid of the general formula

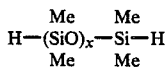

wherein Me denotes the methyl radical and x is on average about 15. This fluid had a flash point of 116° F., a viscosity of 9.09 cS at 25° C. and an SiH content of 0.165% hydrogen.

(B) 54 grams of fluid comprised of vinyl endblocked polydimethylsiloxane of the general formula

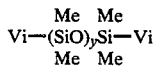

wherein Vi denotes the vinyl radical and y is on average about 7. This fluid had a flash point of 110° F., a viscosity of 4.77 cS at 25° C. and a vinyl content of 7.7%.

(C) 0.52 grams of a cyclopolysiloxane mixture having the general formula

wherein z ranged between 3 and 5;

(D) 0.75 grams of a chloroplatinic acid complex of divinyltetramethyldisiloxane diluted with dimethylvinylsiloxy endblocked polydimethylsiloxane to provide 0.6 weight percent platinum (prepared according to methods of U.S. Pat. No. 3,419,593 to Willing).

(E) 0.25 grams of bis(2-methoxy-1-methylethyl) maleate inhibitor.

The initial viscosity of the fluid upon mixing was less than 10 centistokes at 25° C. The platinum catalyst and the inhibitor were mixed with the vinyl endblocked fluid before being blended with the Si-H endblocked fluid. This composition cured into an elastomer within several days after being mixed upon storage at 25° C.

Example 2

This example demonstrates that the water block composition of the present invention provides benefits to a cable treated with such fluid. Three-hundred foot sections of a stranded 1/0 aluminum conductor, crosslinked polyethylene insulated electrical distribution cable were filled at 500, 750 and 1000 psi pressure with a composition identical to that of Example 1. A 300 foot section of the same type of cable was retained for the purposes of comparison (i.e., the control cable). The electrical breakdown characteristics of the cables were evaluated in accordance with industry practice using Association of Edison Illuminating Companies (AEIC) Test Number 582, results being shown in the following table.

| Fill Pressure (psi) | High Voltage Time Test (Volts/Mil) | Impulse Strength Test (Volts/Mil) |
|---|---|---|
| 500 | 856 | 3419 |
| 750 | 1071 | 3492 |
| 1000 | 1018 | 3342 |
| Control | 806 | 3719 |

Although the high voltage impulse breakdown point of the filled cables was somewhat decreased over the control, these values are still within acceptable limits. On the other hand, there was observed a surprising increase of electrical strength in the High Voltage Time Test, wherein as much as a 33% increase of breakdown strength over control was obtained for the cable filled at 750 psi.

Example 3

The following example shows that the catalyst level used in a specific water block formulation can be used to control the rate at which the composition's viscosity increases as it proceeds toward a cured state. A mixture as in Example 1, but without the inhibitor, was prepared using 500 grams of the SiH endblocked fluid, 290 grams of the vinyl endblocked fluid, and 6 grams of the cyclopolysiloxane. Various levels of the platinum catalyst of Example 1 were added to aliquots of this mixture and the time for the aliquots to double in viscosity was measured. It was found that the logarithm of the time required for the viscosity to double was directly related to the logarithm of the concentration of the platinum catalyst according to the leastsquares regression fit represented by the formula:

$$\ln Y = 1.2231 \ln X + 4.8151$$

in which X is the actual platinum content in ppm and Y is the time in hours at which the composition viscosity doubled its original value. Table 1 shows the actual data points.

TABLE 1

Relationship of Catalyst Concentration to Cure Time

| X (ppm Platinum) | Y (hours required to double viscosity) |
|---|---|
| 1.25 | 90 |
| 2.5 | 40 |
| 5 | 18 |
| 10 | 8 |
| 20 | 3 |

TABLE 1-continued

Relationship of Catalyst Concentration to Cure Time

| X (ppm Platinum) | Y (hours required to double viscosity) |
| --- | --- |
| 31 | 1.8 |

Example 4

This example demonstrates the flexibility in controlling the viscosity-time profile obtainable with the inhibited water block compositions of this invention. Several mixtures having varying amounts of the inhibitor (component E) were prepared using the ingredients of Example 1 wherein the ratios of components (A) through (C) was essentially the same as in Example 1 and the platinum concentration was held at 31 ppm based on actual platinum in the system. It was found that the logarithm of the time required for the viscosity of these mixtures to double was directly related to the ratio of inhibitor to platinum complex weights according to the least-squares regression fit represented by the formula:

$$\ln Y' = 4.5907\, X' + 0.55739$$

in which $X'$ is the weight ratio of component (E) to component (D) and $Y'$ is the time in hours at which the composition viscosity doubled its original value. Table 2 shows the actual data points.

TABLE 2

Effect of Inhibitor to Catalyst Ratio on Cure Rate

| X' (Wt. Inhibitor/Wt. Catalyst) | Y' (Hours to Double Viscosity) |
| --- | --- |
| 0 | 1.83 |
| 0.05 | 2.20 |
| 0.1 | 2.83 |
| 0.2 | 4.84 |
| 0.4 | 14.00 |
| 0.5 | 22.99 |

We claim:

1. A method of extending the serviceable life of a stranded conductor electrical distribution cable comprising: (i) filling the interstices of said conductor with a curable water block composition, and (ii) curing said composition to a non-flowing state, said composition comprising
    (A) an Si-H endblocked polydiorganosiloxane fluid having a viscosity of 0.5 to about 100 centistokes at 25° C. and represented by the formula H(R'$_2$Si-O)$_x$(R'$_2$Si)H wherein R' is independently selected from alkyl radicals having from 1 to 6 carbon atoms or the phenyl radical and the average value of x is 1 to 40;
    (B) a polydiorganosiloxane fluid having a viscosity of 0.5 to about 100 centistokes at 25° C. and represented by the formula

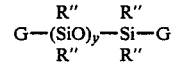

wherein G denotes unsaturated radicals independently selected from the vinyl group or higher alkenyl radicals represented by the formula —R'''(CH$_2$)$_m$CH=CH$_2$, in which R''' denotes —(CH$_2$)$_p$— or —(CH$_2$)$_q$CH=CH—, m is 1, 2, or 3, p is 3 or 6 and q is 3, 4 or 5, R'' is independently selected from an alkyl radical having 1 to 6 carbon atoms or a phenyl radical and y is on the average from 1 to about 40;
    (C) a siloxane crosslinker selected from short chain linear or cyclic siloxanes containing SiH functionality or Si-G functionality, in which G has the above-defined meaning;
    (D) sufficient hydrosilation catalyst to cure the mixture of (A), (B), and (C); and
    (E) sufficient polymerization inhibitor to prevent the water block composition from curing to a non-flowing state before the cable is filled with the combination of (A), (B), (C), (D) and (E).

2. The method according to claim 1, wherein G is selected from vinyl or 5-hexenyl radicals.

3. The method according to claim 2, wherein R' and R'' groups are methyl.

4. The method according to claim 3, wherein G is the vinyl radical and said siloxane crosslinker is (MeViSiO)$_z$, in which Me denotes the methyl radical, Vi denotes the vinyl radical and z is 3 to 5.

5. The method according to claim 4, wherein x is about 5 to 20 and y is about 5 to 20.

6. The method according to claim 5, wherein about 100 parts by weight of component (A), about 54 parts by weight of component (B) and about 0.5 part by weight of component (C) are employed in said composition and wherein x is about 15 and y is about 7.

7. The method according to claim 6, wherein said hydrosilation catalyst is a chloroplatinic acid complex of divinyltetramethyldisiloxane diluted in dimethylvinylsiloxy endblocked polydimethylsiloxane and said polymerization inhibitor is bis(2-methoxy-1-methylethyl) maleate.

8. An improved stranded conductor electrical distribution cable prepared according to the process of claim 1.

9. An improved stranded conductor electrical distribution cable prepared according to the process of claim 2.

10. An improved stranded conductor electrical distribution cable prepared according to the process of claim 3.

11. An improved stranded conductor electrical distribution cable prepared according to the process of claim 4.

12. An improved stranded conductor electrical distribution cable prepared according to the process of claim 5.

13. An improved stranded conductor electrical distribution cable prepared according to the process of claim 6.

14. An improved stranded conductor electrical distribution cable prepared according to the process of claim 7.

* * * * *